United States Patent
Yang et al.

(10) Patent No.: US 7,363,652 B2
(45) Date of Patent: Apr. 22, 2008

(54) METHOD FOR PREVENTING TRANSMISSION CONTROL PROTOCOL SYNCHRONOUS PACKAGE FLOOD ATTACK

(75) Inventors: Yong Yang, Shenzhen (CN); Xindong Teng, Shenzhen (CN); Hongzhou Jiang, Shenzhen (CN); Minglei Li, Shenzhen (CN); Qiang Zhao, Shenzhen (CN); Fei Zheng, Shenzhen (CN); Jiansen Yang, Shenzhen (CN); Jingze Guo, Shenzhen (CN); Yan Qi, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 916 days.

(21) Appl. No.: 10/613,159

(22) Filed: Jul. 3, 2003

(65) Prior Publication Data

US 2004/0153669 A1    Aug. 5, 2004

(30) Foreign Application Priority Data

Jul. 18, 2002    (CN) ................. 02 1 26618

(51) Int. Cl.
*G06F 17/30* (2006.01)
*G06F 17/00* (2006.01)

(52) U.S. Cl. ................. 726/11; 726/23; 726/27

(58) Field of Classification Search ............ 726/11, 726/14, 12, 23, 27
See application file for complete search history.

(56) References Cited

OTHER PUBLICATIONS (http://www.cisco.com/univercd/cc/td/doc/product/software/ios112/intercpt.htm.*
(http://www.cisco.com/univercd/cc/td/doc/product/software/ios112/intercpt.htm, no date.*

A New Method to Resist Flooding Attacks in Ad Hoc Networks Shaomei Li; Qiang Liu; Hongchang Chen; Mantang Tan; Wireless Communications, Networking and Mobile Computing, 2006. WiCOM 2006.International Conference on Sep. 22-24, 2006 pp. 1-4.*

A Detective Method for SYN Flooe Attacks Nakashima, T.; Ohsima, S.; Innovative Computing, Information and Control, 2006. ICICIC '06. First International Conference on vol. 1, Aug. 30-01, 2006 pp. 48-51.*

An active detecting method against SYN flooding attack Bin Xiao; Wei Chen; Yanxiang He; Sha, E.H.-M.; Parallel and Distributed Systems, 2005. Proceedings. 11th International Conference on vol. 1, Jul. 20-22, 2005 pp. 709-715 vol. 1.*

* cited by examiner

*Primary Examiner*—David-Y Au Jung

(57) ABSTRACT

The invention relates to a method for preventing TCP SYN package flood attack, and belongs to the computer network security field. First, the firewall receives a client a TCP SYN connection request package, and responses, as an agent of the server, an acknowledgement of the TCP SYN connection request package with zero window size to the client. Then, the firewall records information about the TCP SYN connection request package and checks whether the connection request is legal. When the firewall has received a TCP SYN response package from the server, it returns an acknowledgement of said TCP SYN response package. At the same time, the firewall, as an agent of the server, sends an acknowledgement packet with nonzero window size to the client for initiating data transmission from the client. After that, data packets are transferred between the client and the server forwarded by the firewall as an agent. With the invention method, it can guarantee that protected servers in a computer network will not be destroyed by TCP SYN package flood attack.

5 Claims, 5 Drawing Sheets

METHOD FOR PREVENTING TRANSMISSION CONTROL PROTOCOL SYNCHRONOUS PACKAGE FLOOD ATTACK

CROSS-REFERENCE TO RELATED APPLICATIONS

This application claims the benefit of Chinese Patent Application No. 02126618.2 filed on Jul. 18, 2002. The disclosure of the above application is incorporated herein by reference.

FIELD OF THE INVENTION

The present invention relates generally to computer network security technology, and more particularly to a method for preventing Transmission Control Protocol (TCP) synchronous (SYN) package flood attack.

BACKGROUND OF THE INVENTION

TCP is one of the transport layer protocols in Internet, and is the base for many network applications. The TCP SYN package flood attack is a denial service attack, which is usually seen in networks. Implementing this attack is simple, but it can be destructive. Resource of an attacked server can be used up; in worst case the operating system can be crashed, so all legitimate connection requests cannot be responded.

The TCP SYN package flood attack is happened during the TCP connection establishment of three-way handshake. Suppose a client sends a TCP SYN connection request package to a server for requesting a TCP connection, and then the client is died or offline suddenly. In this case, the server cannot obtain a TCP SYN acknowledgment package of a TCP SYN response package from the client after the server send the TCP SYN response package to the client, i.e., the three-way handshake cannot be completed. In general, the server will retransmit a new TCP SYN response package again. After waiting for a period of time, if the TCP SYN acknowledgment package of the new TCP SYN response package cannot be received, the server will discard the connection.

In a normal situation, these are only some rare accidents. Nevertheless, if an attacker intentionally and maliciously simulates the situation, then the server must spend a lot of resource to deal with these half-open TCP connections. Finally, stacks of the server will be overflow and the server will be crashed. When the server is dealing with TCP SYN package attacks, it cannot responses normal requests. From client point of view, response of the server is lost. To prevent the TCP SYN package flood attack, servers itself can take some manners, but they are limited and only effective to a specific system. In practice, most of the networks take firewall to prevent the TCP SYN package flood attack.

At present to prevent a TCP SYN package flood attack, the firewall monitors the TCP connection. Principle of the method is shown in FIG. 1, and the working procedure is as followings:

1. When the firewall has received a TCP SYN connection request package from a client, the firewall transmits the TCP SYN connection request package to a server;
2. The server responds the firewall with a TCP SYN response package, and the firewall transmits the TCP SYN response package to the client;
3. The firewall sends a TCP SYN acknowledgement package to the server for the TCP SYN response package;
4. According to whether the connection request is legal, two possibilities happen:
   (a) if the TCP SYN connection request package from the client is legal, then the firewall transmits a TCP SYN acknowledgement package from the client to the server, but the server will ignore the TCP SYN acknowledgement package since the connection has been established;
   (b) if the TCP SYN connection request package from the client is illegal or the TCP SYN acknowledgement package from the client is out of time, then the firewall sends a Reset package to the server and the server disconnects the connection.

The above method can prevent the TCP SYN package flood attack in a certain degree, but there is an obvious drawback. That is whether a TCP SYN connection request package is legal or not, the TCP SYN connection request package is forwarded to the server directly. After an illegal TCP SYN connection request package is judged, the connection is discarded. Even though, a server is affected by a TCP SYN package flood attack and the server resource is wasted.

SUMMARY OF THE INVENTION

Objective of the invention is to propose a method that will prevent the TCP SYN package flood attack and overcome wasting server resource of the present technology. The method will protect servers out of any TCP SYN package flood attack.

The method proposed by the invention for preventing TCP SYN package flood attack comprise the following steps:

1. When the firewall has received a TCP SYN connection request package from a client, the firewall, as an agent of the server, returns a TCP SYN response package with zero window size, which informs the client doesn't send data packets right now.
2. The firewall records information of the TCP SYN connection request package and checks whether the client connection request is legal. If the firewall has not received a TCP SYN acknowledgement package of the TCP SYN response package after a period of time, the connection request is illegal and no further processing will be made. If the firewall has received the TCP SYN acknowledgement package of the TCP SYN response package, then the connection request is legal and the connection between the firewall and the client has been established. At the same time, the firewall, as an agent of the client, sends a TCP SYN connection request package to the server.
3. When the firewall has received a TCP SYN response package from the server, the firewall, as an agent of the client, responses with a TCP SYN acknowledgement package for the TCP SYN response package from the server. The TCP connection between the firewall and the server has been established. At the same time, the firewall sends a TCP SYN acknowledgement package for the TCP SYN response package from the server with nonzero window size to the client to initiate the data transmission from the client.
4. Data packets transmission between the client and the server is forwarded by the firewall. The firewall records information of the data packets passing through and adjusts the sequence number of the data packets accordingly.

In this method, the firewall intercepts all TCP SYN connection request packages, and acts as the client to establish connections with the server, and acts as the server to establish connections with the client. After these two connections have been established, the firewall plays a relay function between them. Therefore, only the legal TCP connection request can be forwarded to the server to avoid waste of server resource comparing with the present technology. In the monitoring mode, the firewall passively observes the number of half-open connections. When the number is greater a threshold, half-open connections will be closed by the firewall. The firewall has a strict time-out limitation in order to avoid its resource to be wasted thoroughly by TCP SYN package flood attacks.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The invention will be described in more detail, hereinafter, with reference to drawings and embodiments.

Figure 1:
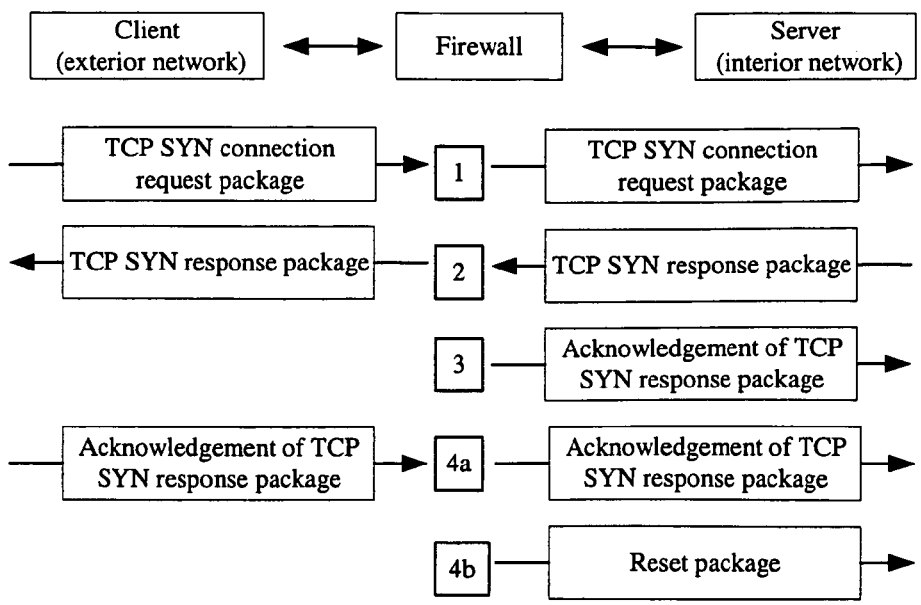
FIG. 1 shows the present method to prevent TCP SYN package flood attacks.
Figure 2:
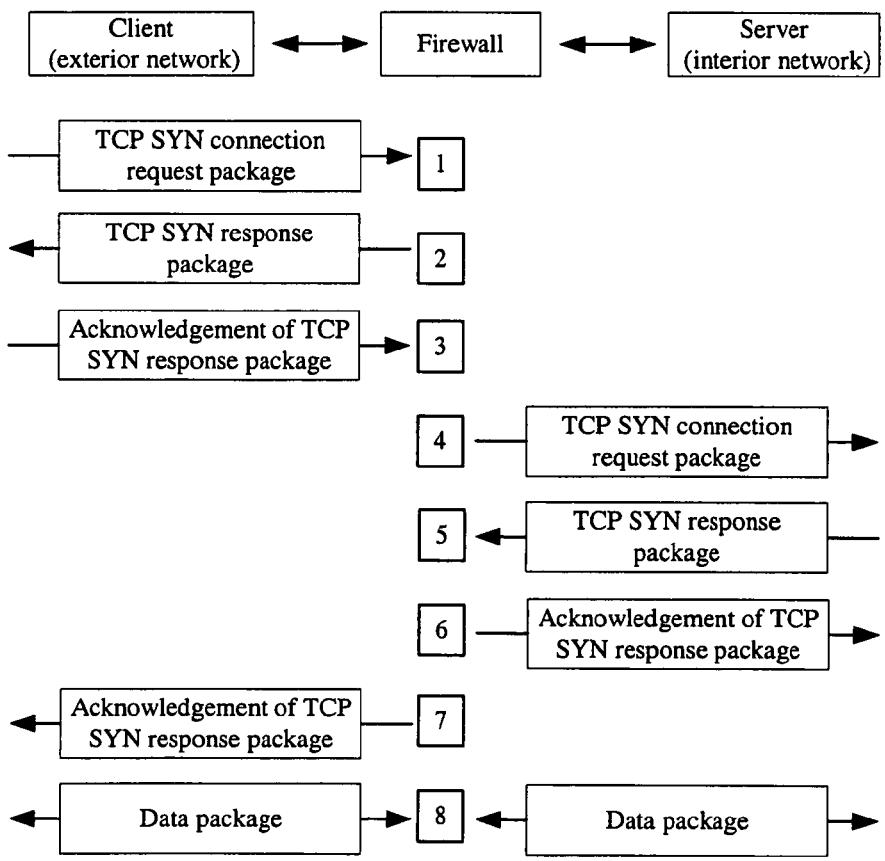
FIG. 2 shows the principle diagram of the invention, wherein the sequence number is the state numbering.

Principle of the invention is shown in FIG. 2. First, the firewall receives a TCP SYN connection request package from a client, and as an agent of the server, responds a TCP SYN response package with zero window size for the TCP SYN connection request package. This is used to inform that the client doesn't send data right now. Then, the firewall checks whether the received client connection request is legal, and records correlation information of the TCP SYN connection request package. The correlation information is a source sequence number, an acknowledgement sequence number, and a window size of the packages that come from the client or the server. If the firewall does not receive a TCP SYN acknowledgement package of the TCP SYN response package sent by it, then the client connection request is illegal and will be discarded. If the firewall receives a TCP SYN acknowledgement package of the TCP SYN response package, then the client connection request is legal. Then, the firewall, as an agent of the client, sends a TCP SYN connection request package to the server. After having received a TCP SYN response package from the server, the firewall returns a TCP SYN acknowledgement for it and the connection between the firewall and the server is established. After that, the firewall as an agent of the server sends a TCP SYN acknowledgement package with nonzero window to the client for the TCP SYN response package from the server to initiate data transmission from the client. Finally, data packages are forwarded by the firewall between the client and the server, and the firewall transforms sequence numbers of the packages according the recorded correlative information.

Figure 3:
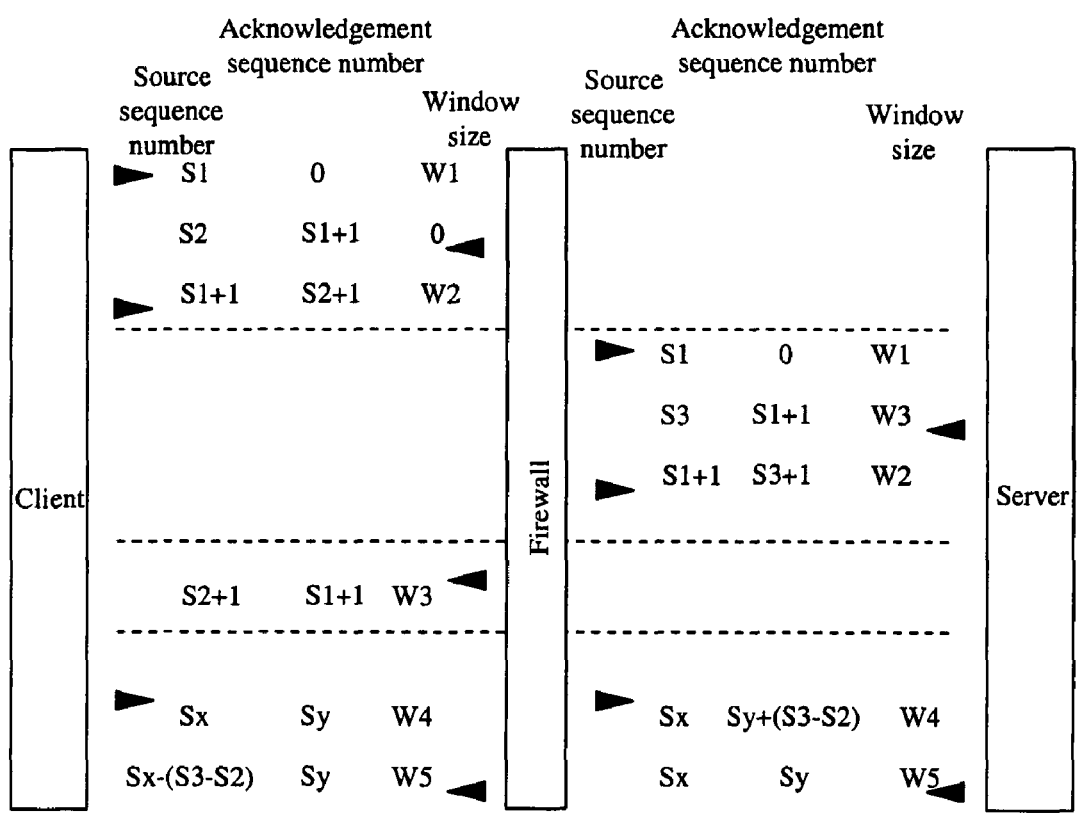
FIG. 3 shows the source sequence number, acknowledgement sequence number and window size corresponding to every conversation state.

In order to describe the invention method more clearly, the conversation states are defined. The method names the initiating end of a connection as a client, and the other end as a server. They communicate each other through the firewall relay. When a client initiates a connection, the firewall doesn't transfer the TCP SYN connection request package to the server, but pretends itself as a server and returns the TCP SYN response package to the client for the TCP SYN connection request package. After the client is confirmed, the firewall pretends itself as a client and initiates the connection request to the server. When data packages are transferred between the client and the server through the firewall, the firewall only adjusts the sequence number of the packages. During this procedure, several conversation states are shown on Table 1. Source sequence numbers and window sizes of every conversation state are shown in FIG. 3.

TABLE 1

| State number | Name | Source sequence number/acknowledgement sequence number/window size |
|---|---|---|
| 1 | Client sends TCP SYN connection request packages | S1/0/W1 |
| 2 | Return TCP SYN response packages to client | S2/S1 + 1/0 |
| 3 | Client acknowledges the TCP SYN response packages | S1 + 1/S2 + 1/0 |
| 4 | Send TCP SYN connection request packages to server | S1/0/W1 |
| 5 | Receive TCP SYN response packages from server | S3/S1 + 1/W3 |
| 6 | Return acknowledgement to server for TCP SYN response packages from server | S1 + 1/S3 + 1/W2 |
| 7 | Send TCP SYN acknowledgement packages with nonzero size window to client | S2 + 1/S1 + 1/W3 |
| 8 | Send data packages to server after connection has been established | Sx/Sy + (S3 − S2)/W4 |
|  | Send data packages to client after connection has been established | Sx − (S3 − S2)/Sy/W5 |

Symbols in Table 1 and FIGS. 3, 4, 5, 6 and 7 are described as follow:

The combination of a digital following S represents a specific sequence number, and the combination of a digital following W represents a specific window size. Sx and Sy are presented at state 8, and represent a non-specific sequence number (the two are not equal).

The method of the invention includes the following four processing flows according to the time sequence:

(1) a processing flow that the firewall has received a TCP SYN connection request package from a client, shown in states 1 and 2 of Table 1 and FIG. 2;

(2) a processing flow that the firewall has received the first TCP SYN acknowledgement package from the client for a TCP SYN response, shown in states 3 and 4 of Table 1 and FIG. 2;

(3) a processing flow that the firewall has received a TCP SYN acknowledgement package for a TCP SYN response package from a server, shown in states 5, 6 and 7 of Table 1 and FIG. 2;

(4) a processing flow that the firewall has received a data package, shown in state 8 of FIG. 2 and Table 1.

Figure 4:
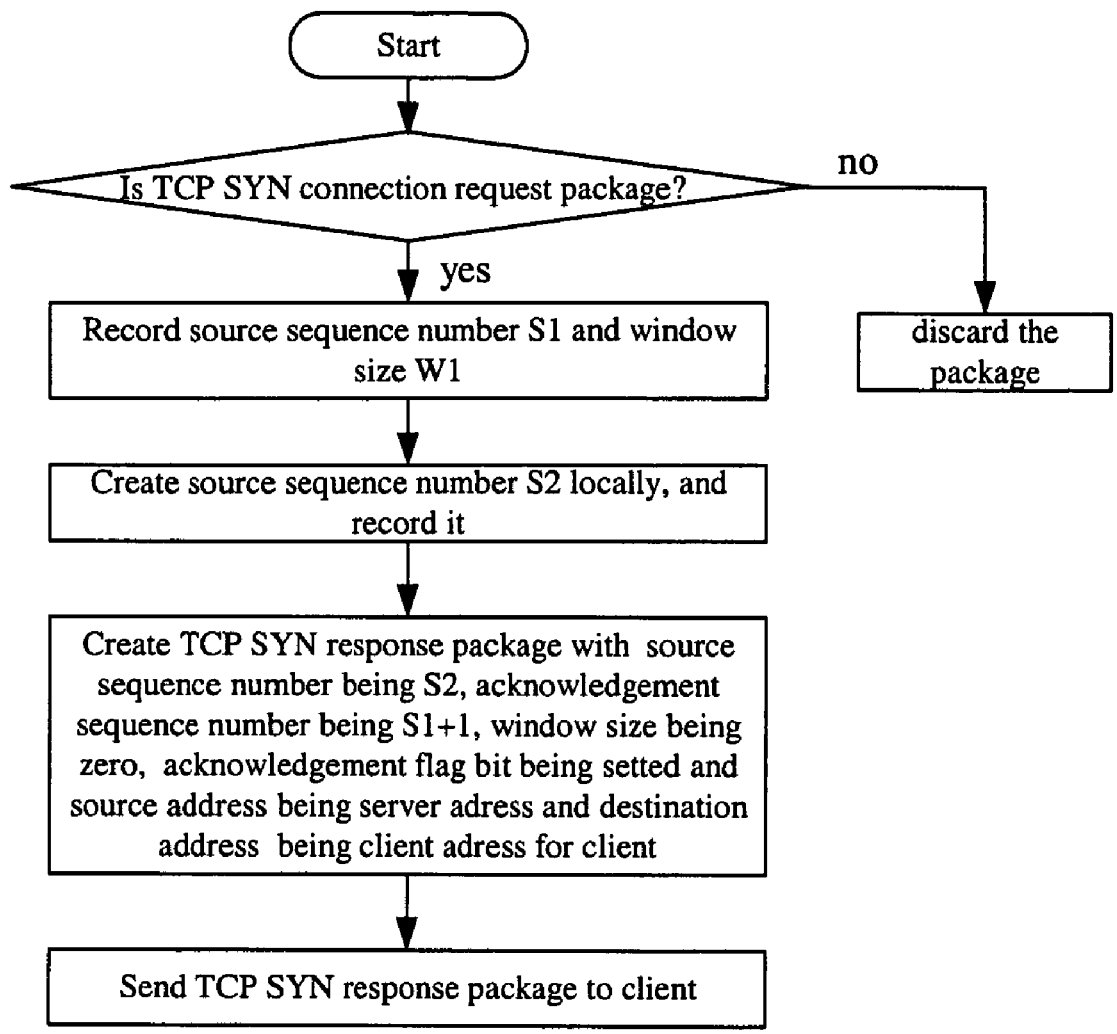
FIG. 4 shows the processing flowchart when the firewall has received a TCP SYN connection request package.

The first processing flow, the firewall having received a TCP SYN connection request package from a client, is shown in FIG. 4. When the firewall has received a TCP SYN connection request package from a client, the source sequence number and the window size of the package are recorded. The recorded source sequence number and the window size will be used when sending a TCP SYN connection request package to a server, after the connection between the client and the firewall has been established. Then, the firewall sends a TCP SYN response package to the client, which has a source sequence number created by the firewall, a zero window size and the server address (not the firewall address) as a source address.

Figure 5:
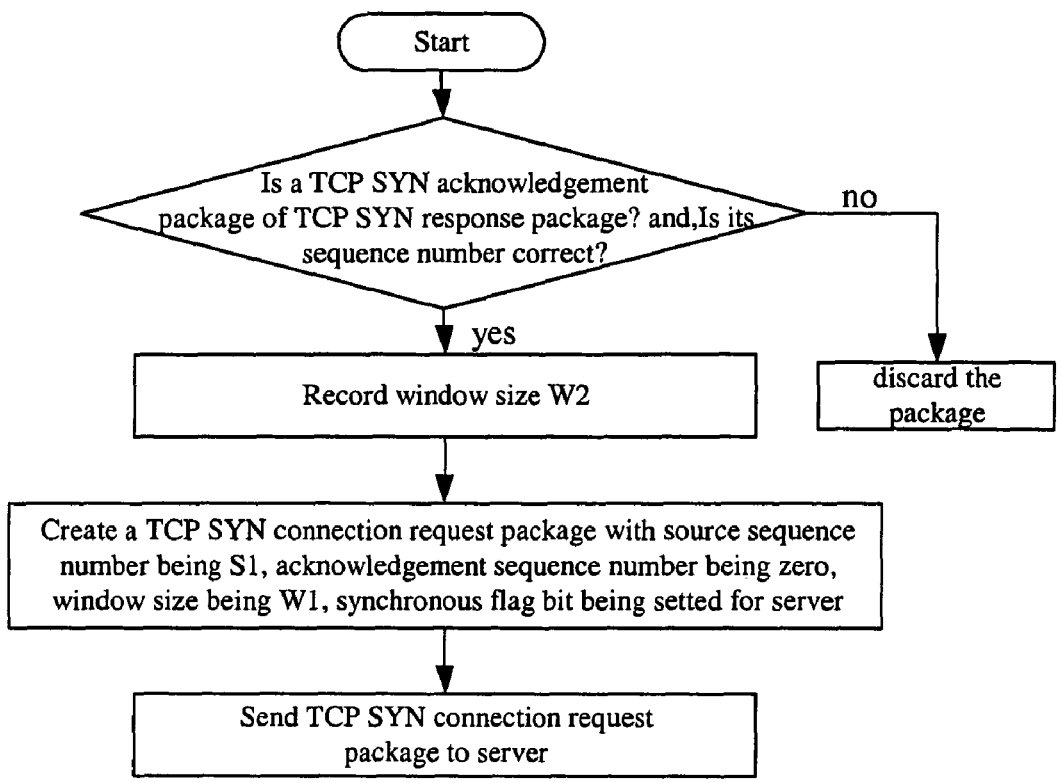
FIG. 5 shows the processing flowchart when the firewall has received a first TCP SYN acknowledgement package from a client.

The second processing flow, the firewall having received the first TCP SYN acknowledgement package from the client of the TCP SYN response package, is shown in FIG. 5. At the beginning of this flow, the firewall is waiting for an acknowledgement of the TCP SYN response package. After the firewall has received the first TCP SYN acknowledgement package from the client of the TCP SYN response package, the sequence number is checked and the window size W2 is recorded, which will be used when sending a connection request to a server. At this moment, the connection between the client and the firewall has been completely established. After that, the firewall will establish connection with a server and return a TCP SYN acknowledgement package to the client based on information obtained from the server. The firewall sends to the server a TCP SYN connection request package, which takes source sequence number and window size which are recorded while the client initiating a connection, and client address as source address (not the firewall address) and server address as destination address.

Figure 6:
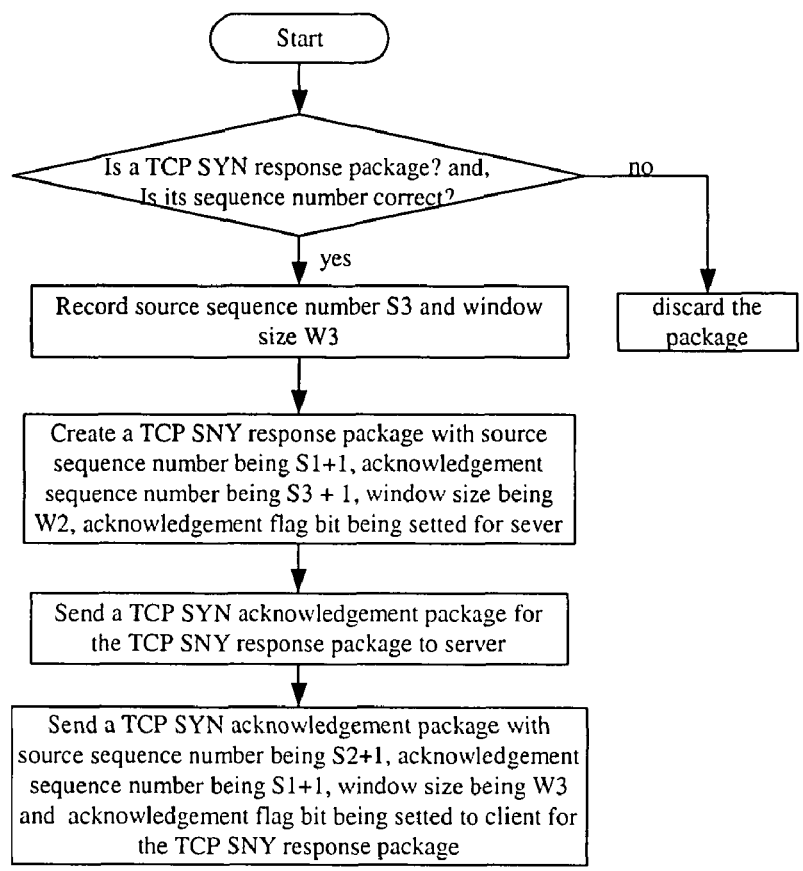
FIG. 6 shows the processing flowchart when the firewall has received a TCP SYN response package from the server.

The third processing flow, the firewall having received a TCP SYN acknowledgement package for a TCP SYN response package from the server, is shown in FIG. 6. When the firewall has received the TCP SYN response package from the server, the sequence number is checked and recorded, and the window size is recorded too. Then, the firewall sends the TCP SYN acknowledgement package with the client address as source address, the server address as destination address to the server for the TCP SYN response package from the server. In addition, the firewall sends a TCP SYN acknowledgement package with the client address as destination address, the server address as source address and a nonzero window size to the client for the TCP SYN response package from the server. At this moment, connection between the client and the server has been established.

Figure 7:
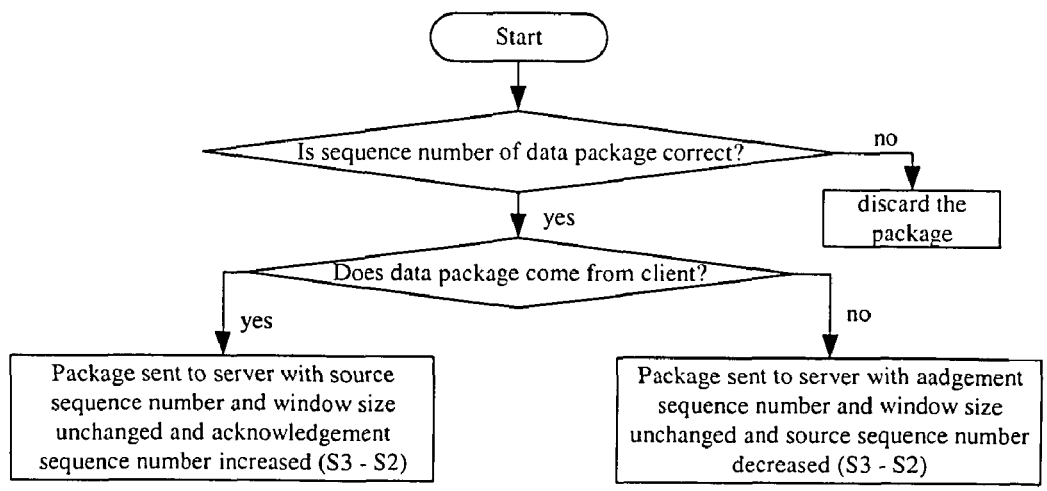
FIG. 7 shows the processing flowchart when the firewall has received a data package.

The fourth processing flow, the firewall having received data packages, is shown in FIG. 7. After the connection between the client and the firewall and the connection between the firewall and the server have been established, the firewall only adjusts sequence number of the data packages passing through and keeps other field unchanged.

The sequence number is adjusted as follow (wherein S2 and S3 are recorded at processing flow 1 and 3, respectively). For the data package coming from the client, the source sequence number and window size are kept unchanged, but the acknowledgement sequence number is increased with (S3-S2), then the data package is sent to the server. For the data packet coming from the server, the acknowledgement sequence number and window size are kept unchanged, but the source sequence number is decreased with (S3-S2), then the data package is sent to the client.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for preventing Transmission Control Protocol (TCP) synchronize (SYN) package flood attacks, comprising the steps of:

(1) a firewall having received a TCP SYN connection request package from a client, creating a TCP SYN response package with a zero window size for the client to inform the client not to send data packages, and returning to the client by the firewall as an agent of a server;

(2) detecting whether having received a TCP SYN acknowledgement package from the client, if yes, creating a TCP SYN connection request package for the server and sending to the server by the firewall as an agent of the client, otherwise discarding the TCP SYN connection request package from the client;

(3) having received a TCP SYN response package from the server, creating a TCP SYN acknowledgement package for the server and returning to the server, at same time, creating a TCP SYN acknowledgement package with a non-zero window size for the client to inform the client to initiate data transmission and sending to the client;

(4) forwarding data packages coming from the client to the server by the firewall as an agent of the client, and forwarding data packages coming from the server to the client by the firewall as an agent of the server.

2. The method according to claim 1, wherein step 1 further comprising, after having received the TCP SYN connection request package from the client, recording source sequence number and window size of the TCP SYN connection request package from the client;

wherein creating a TCP SYN response package for the client further comprises, creating the TCP SYN response package with a source sequence number produced by the firewall, source address being the server address and destination address being the client address.

3. The method according to claim 1, wherein step 2 further comprising, after having received the TCP SYN acknowledgement package from the client, recording window size of the TCP SYN acknowledgement package from the client;

wherein creating a TCP SYN connection request package for the server comprising, creating the TCP SYN connection request package with source sequence number and window size of the TCP SYN connection request package from the client, source address being the client address and destination address being the server address.

4. The method according to claim 1, wherein step 3 further comprising: after having received the TCP SYN response package from the server, recording source sequence number and window size of the TCP SYN response package from the server;

wherein creating a TCP SYN acknowledgement package for the server comprises, creating the TCP SYN acknowledgement package for the server with window size of the TCP SYN acknowledgement package from the client, destination address being the server address and source address being the client address;

wherein creating a TCP SYN acknowledgement package for the client further comprises, creating the TCP SYN acknowledgement package with destination address being the client address and source address being the server address.

5. The method according to claim 1, wherein forwarding data packages coming from the client to the server by the firewall as an agent of the client comprising, keeping source sequence number and window size of the data package from the client unchanged, calculating a difference between source sequence number of the TCP SYN response package from the server and source sequence number of the TCP SYN response package for the client, modifying acknowledgement sequence number of the data package from the client by increasing the difference, and then sending the modified data package to the server;

wherein forwarding data packages coming from the server to the client by the firewall as an agent of the server comprising, keeping acknowledgement sequence number and window size of the data package from the server unchanged, calculating a difference between source sequence number of the TCP SYN response package from the server and source sequence number of the TCP SYN response package for the client, modifying source sequence number of the data package from the server by decreasing the difference, and then sending the modified data package to the client.

\* \* \* \* \*